US005379271A

United States Patent [19]
Moedt

[11] Patent Number: 5,379,271
[45] Date of Patent: Jan. 3, 1995

[54] CHRONOGLOBE

[76] Inventor: Philip C. Moedt, 1032 N. Harvey, Oak Park, Ill. 60302

[21] Appl. No.: 161,154

[22] Filed: Dec. 2, 1993

[51] Int. Cl.⁶ .............................................. G04B 19/22
[52] U.S. Cl. ..................................................... 368/24
[58] Field of Search ........................ 368/15, 17, 21-24

[56] References Cited

U.S. PATENT DOCUMENTS

| | | | |
|---|---|---|---|
| 41,933 | 3/1864 | Perce | 434/134 |
| 648,117 | 4/1900 | Stubblefield | 434/134 |
| 794,466 | 7/1905 | Robinson | 434/134 |
| 1,070,546 | 8/1913 | Sherlock | 434/134 |
| 1,157,219 | 10/1915 | Hard | 434/142 |
| 1,674,161 | 6/1928 | De Bogory | 434/142 |
| 2,020,284 | 11/1935 | Beck | 434/143 |
| 2,059,031 | 10/1936 | Replogle | 434/142 |
| 2,247,394 | 7/1941 | Mills | 368/23 |
| 2,323,837 | 7/1943 | Neal | 434/134 |
| 2,333,475 | 11/1943 | Dupler | 368/23 |
| 2,355,304 | 8/1944 | Koch | 368/23 |
| 2,490,185 | 12/1949 | Work | 434/145 |
| 2,492,785 | 12/1949 | Concordet | 434/145 |
| 2,496,827 | 2/1950 | Tellier | 434/143 |
| 2,515,401 | 7/1950 | Dupler | 35/46 |
| 2,680,308 | 6/1954 | Miltenberger | 368/24 |
| 2,785,528 | 3/1957 | Kernick | 368/24 |
| 2,907,166 | 10/1959 | Baccara | 368/24 |
| 3,014,287 | 12/1961 | Ernst | 368/24 |
| 3,049,863 | 8/1962 | Ranney | 368/24 |
| 3,197,893 | 8/1965 | Mariotti | 368/24 |
| 3,292,361 | 12/1966 | Redmond | 368/23 |
| 3,305,946 | 2/1967 | Gardin | 368/24 |
| 3,348,321 | 10/1967 | Cunningham | 368/24 |
| 3,370,415 | 2/1968 | McIlvaine | 368/24 |
| 3,516,243 | 6/1970 | Hazard | 368/24 |
| 3,527,046 | 4/1970 | Pawl | 368/24 |
| 3,827,233 | 8/1974 | Echevarria | 368/23 |
| 4,102,121 | 7/1978 | Veazey | 368/24 |
| 4,308,604 | 12/1981 | Graham | 368/23 |
| 4,671,672 | 6/1987 | Hubner | 368/23 |
| 4,714,351 | 12/1987 | Domen | 368/24 |
| 4,761,138 | 8/1988 | Niesyn | 434/136 |
| 4,936,779 | 6/1990 | Carlson | 368/24 |
| 4,971,559 | 11/1990 | Amano | 434/143 |
| 5,008,867 | 4/1991 | Ko | 368/23 |
| 5,132,943 | 7/1992 | Davies | 368/21 |

FOREIGN PATENT DOCUMENTS

WO8601916  3/1986  WIPO .................................. 368/23

Primary Examiner—Vit W. Miska

[57] ABSTRACT

A rotating sphere (98) within a rotating sphere (20) device. The outer sphere (20) is a translucent earth globe. The slightly smaller inner sphere (98), consisting of one reflective white surfaced hemisphere (100) and one nonreflective black surfaced hemisphere (102), is the day-night, "terminator" line device. With normal levels of incident light, this inner sphere (98) reflects (or non-reflects) light back through the translucent earth globe (20) giving a day-night appearance to the outer earth globe (20). The inner sphere (98) is controlled by a set of outer control magnets (126A,B) that are "locked" to a set of inner magnets (114A,B) attached to the inner sphere (98). These outer magnets (126A,B), external to the earth globe (20), are rotated to achieve inner sphere (98) "terminator" line (104) rotation. With continued, appropriately timed, rotational stepping of both the outer earth globe (20) and the inner day-night sphere (98), display of proper visual manifestations and chronometric characteristics of the Earth-Sun astronomical system are presented throughout the calendar year. An associated alternate sphere role reversal configuration, using the outer sphere (204) as the day-night sphere and inner sphere (202) as the earth globe sphere, also presents display of proper visual manifestations and chronometric characteristics.

1 Claim, 7 Drawing Sheets

CHRONOGLOBE

BACKGROUND—FIELD OF INVENTION

The field of this invention involves devices providing celestial body and associated sunlight, shadow representations. The focus of this invention relates to earth globes, specifically to such globes which have the ability to present, display, and maintain, the proper visual manifestations and chronometric characteristics of the Earth-Sun astronomical system throughout the calendar year.

BACKGROUND—DISCUSSION OF PRIOR ART

The vast majority of earth globes currently available only presents the earth in a static representation, that is, manual spinning of the globe on its north-south axis is possible but they do not have the inherent capability to present, display, and maintain the proper visual, chronometric, and astronomical manifestations of the Earth-Sun astronomical system throughout the calendar year. These static earth globes do not attempt to present on an ongoing basis, time, date, and season with respect to the rotation of the Earth about its own axis and the rotation of the Earth around the Sun.

Many product versions of the earth globe have been envisioned that present, in part or in total, the proper visual manifestations and chronometric characteristics of the Earth-Sun astronomical system. U.S. patents having light baffle/hemisphere devices and a vertical earth axis includes:

| | | | | | |
|---|---|---|---|---|---|
| 5132943 | Davies | Jul 21, 1992; | 3516243 | Hazard | Jun 23, 1970 |
| 4761138 | Niesyn | Aug 2, 1988; | 3305946 | Gardin | Feb 28, 1967 |
| 3527046 | Pawl | Sep 8, 1970; | 3049863 | Ranney | Aug 21, 1962 |

U.S. patents having light baffle/hemisphere devices and an inclined earth axis includes:

| | | | | | |
|---|---|---|---|---|---|
| 4936779 | Carlson | Jun 26, 1990; | 3014287 | Ernst | Dec 26, 1961 |
| 4714351 | Domen | Dec 22, 1987; | 2785528 | Kernick | Mar 19, 1957 |
| 4102121 | Veazey | Jul 25, 1978; | 2680308 | Miltenberger | Jun, 1954 |
| 3370415 | McIlvain | Feb 27, 1968; | 2496827 | Tellier | Feb 7, 1950 |
| 3197893 | Mariotti | Aug 3, 1965 | 2492785 | Concordet | Dec 27, 1949 |

U.S. patents having multiple sphere devices include:

| | | | | | |
|---|---|---|---|---|---|
| 3292361 | Redmond | Dec 20, 1966; | 2355304 | Koch | Aug 8, 1944 |
| 2515401 | Dupler | Jul 18, 1950; | 1674161 | DeBogory | Jun 19, 1928 |
| 2490185 | Work | Dec 6, 1949; | | | |

Other U.S. patents of note include:

| | | | | | |
|---|---|---|---|---|---|
| 4971559 | Amano | Nov 20, 1990; | 2333475 | Dupler | Nov 2, 1943 |
| 4671672 | Hubner | Jun 9, 1987; | 2247394 | Mills | Jul 1, 1941 |
| 4308604 | Graham | Dec 29, 1981; | 2059031 | Replogle | Oct 27, 1936 |
| 3827233 | Echevarria | Aug 6, 1974; | 2020284 | Beck | Nov 12, 1935 |
| 2907166 | Baccara | Oct 6, 1959; | 1157219 | Hard | Oct 19, 1915 |

U.S. patents using magnet devices in association with globes or spheres include:

| | | | | | |
|---|---|---|---|---|---|
| 2323837 | Neal | Jul 6, 1943; | 0794466 | Robinson | Jul 11, 1905 |
| 1674161 | DeBogory | Jun 19, 1928; | 0648117 | Stubblefield | Apr , 1900 |
| 1070546 | Sherlock | Aug 19, 1913; | 0041938 | Perce | Mar 15, 1864 |

One or more of the following deficiencies are evident in each of the cited patents: Illumination/mechanization complexity, vertical earth globe position, lack of complete chronometric data presentation, appearance, and incorporation of few elements of a true Chronoglobe.

Currently available is an earth globe product that does present both chronometric and astronomical characteristics. This product is a manifestation of U.S. Pat. No. 5,132,943. This globe product is marketed under the trademark "The Planet Earth Motion Globe"; produced by: Loranda Inc. of Stuart, Fla. This globe is available in various sizes (12, 16, and 20 inches diameter) and styles. It utilizes an internal illumination and light-baffle system to present day-night astronomical characteristics, and a large conical base support structure to present chronometric characteristics. This product uses a earth globe that has its north-south axis in a vertical position.

This product suffers from a number of disadvantages and deficiencies:

(a) This product uses a earth globe that has its north-south axis in a vertical position rather than the approximately 23½ degrees (23.4433 degrees) inclined axis of conventional earth globe products.

(b) It presents the night-day "terminator" line, occurring on the earth globe, in a unnatural (not vertical) position with respect to the Earth-Sun astronomical system.

(c) It incorporates the use of a complicated internal light-baffle system to show and present day-night astronomical characteristics.

(d) It needs internal illumination to operate.

(e) It operates only with the use of AC electrical power.

(f) It incorporates a large, unsightly, conical base structure to present chronometric characteristics.

(g) Multiple chronometric display rings, mounted on the large base, give rise to difficulty of use.

(h) Because of its complexity and approach in presenting chronometric data via its large conical base, it is not amenable to globe products of small size.

Objects and Advantages

Accordingly, several objects and advantages of my invention are:

(a) Provides a simple, but elegant instrument of geometric, chronometric, and astronomic purpose.

(b) Properly presents the geometrical, visual manifestations of the Earth-Sun astronomical system and displays-maintains chronometric characteristics of this Earth-Sun system on an ongoing real-time basis throughout the calendar year.

(c) Presents, in a simple and concise way, time, date, and season with respect to the rotation of the Earth about it own axis and the rotation of the Earth around the Sun.

(d) Provides a globe, timepiece, and astronomical display device created via use of simple concepts and hardware in a novel adaptation of the conventional earth globes currently available.

(e) Presents the earth globe in a natural astronomical position by setting the globe axis inclined approximately 23½ degrees.

(f) Does away with the complex "Motion Globe" internal light-baffle system by use of a simple, durable, easy to control day-night sphere.

(g) Does not require internal illumination to operate; normal levels of incident light is enough to bring forth its operability.

(h) Does away with the unsightly "Motion Globe" base by incorporating the chronometric display on the earth globe itself and on conventional floor or table support structures.

(i) Enables small size, light weight, devices to be constructed.

(j) Enables battery (DC) or powerline (AC) electrical power to be used.

(k) Retains the aesthetic appearance of conventional earth globes as marketed in various tabletop and floor stand models.

(l) Is producible in a variety of models and styles and types, and, in varying degrees of precision and quality.

(m) High degree of utility remains in the device even when incorporating low quality or low precision design and manufacturing approaches.

(n) Enables ease of use because its technical content and related physical manifestations are easy to understand.

(o) Can be sized, styled, and priced for a wide range of home, office, and school markets.

(p) Permits a manual operation approach to day-night sphere rotational control with little loss of chronometric accuracy; this leads to inexpensive models and more voluminous markets.

(q) Permits the day-night sphere manual operation approach to be used in conjunction with conventional static earth globe designs to enhance the utilization of those kinds of globes.

(r) Satisfies an existing need for proper visual representation of the Earth during a time of ever increasing "Earth consciousness".

(s) Is a product that will, in one form or another, eventually replace a significant number of conventional static earth globes currently being used.

Further objects and advantages of my invention will become apparent from a consideration of the drawings and ensuing description of it.

DRAWING FIGURES

Figure 1:
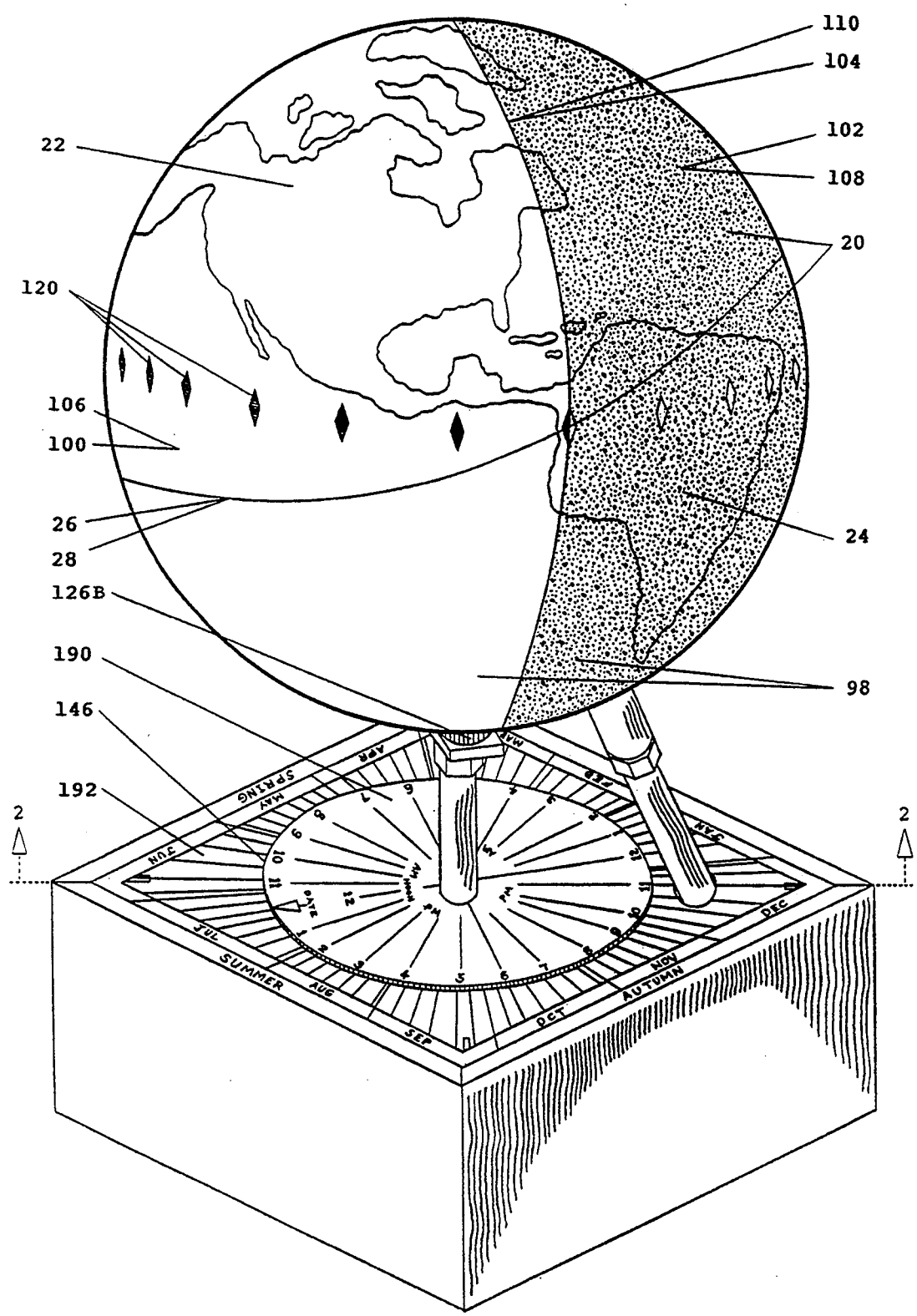
FIG. 1 is a prospective view of a basic configuration, single post support, table top chronoglobe.

Reference Numerals In Drawings 20 earth globe—assembled sphere
22 earth globe—northern hemisphere
24 earth globe—southern hemisphere
26 earth globe equator seam line
28 bonding material
30 earth globe geographic north-south pole axis
32 earth globe attachment stem
34 bonding material
36 screw
38 threaded hole
40 earth globe support post bolt shaft
42 earth globe support post wrench flats
44 earth globe support post bolt threads
46 bushing
48 self-locking nut
50 steel disk
52 thin low friction material disk
54 adhesive backed flexible magnet ring
56 bushing
58 low friction material flanged bushing
60 low friction material flanged bushing
62 washer
64 bolt head
66 drilled hole
68 stepper motor—two wire hookup
70 stepper motor rotating drive shaft
72 mounting flange
74 mounting screw—two required
76 mounting block
78 upper stepped wedge shaped channel cutout
80 low friction stepped wedge shaped bushing
82 bolt hole
84 stepper motor hole
86 lower notch cutout channel
88A,B,C long bolts
90A,B,C self-locking nut
92 base box top
94 hole in base box top
96 base box sides—one bottom tab per side
98 inner day-night sphere—assembled sphere
100 inner sphere—"day" hemisphere 102 inner sphere—"night" hemisphere
104 inner day-night sphere seam "terminator" line
106 highly reflective "white" surface
108 dull, nonreflective "black" surface
110 bonding material
112 inner day-night sphere—vertical axis
114A,B inner day-night sphere magnets (permanent type)
116 inner day-night sphere circular bottoming weight
118 bonding material
120 inner day-night sphere—ecliptic plane hour marks
122 inner say-night sphere—low friction support pad
124 bonding material
126A,B outer control magnets (permanent type)
128 control magnets support arm
130 bonding material
132 knurled nut
134 self-locking nut
136 control magnets center support post bolt shaft
138 center support post wrench flats
140 center support post bolt threads
142 bushing
144 shim
146 steel date arrow-hour marks disk
148 thin low friction material disk
150 adhesive backed flexible magnet ring
152 bushing
154 low friction material flanged bushing
156 low friction material flanged bushing
158 washer
160 bolt head
162 drilled hole
164 stepper motor—two wire hookup
166 stepper motor rotating drive shaft
168 mounting flange
170 mounting screw—two required
172 pedestal
174 bolt hole
176 stepper motor hole
178 lower rectangular cutout channel
180 pedestal opening in base box top
182 base box bottom panel
184A,B,C,D bottom panel attachment screws
186 adhesive backed felt
188 adhesive backed decorative sheeting material
190 adhesive backed date arrow-hour marks decal
192 adhesive backed date-month-season decal
194A,B,C,D solstice-equinox position bars
196 solid state timer device—earth globe
198 solid state timer device—outer control magnets
200A,B,C,D,E,F,G,H power supply—batteries
202 inner earth globe sphere
204 outer day/night sphere
206 lower hemispherical axis bearings/support pad
208 upper hemispherical axis bearings/support pad
210A,B inner earth globe sphere magnets
212 inner sphere lower magnet holder/axis bearing seat structure
214 bonding material
216A,B outer control magnets
218 outer control magnets support arm
220 wrench flats
222 control magnets support post shaft
224 knurled nut
226 shim
228 self-locking nut
230 bushing
232 outer sphere lower attachment stem/axis bearing seat structure
234 outer sphere lower support post shaft
236 self-locking nut
238 bushing
240 outer sphere upper axis bearing seat structure
242 inner sphere upper axis bearing seat structure
244 inner sphere upper axis bearing seat
246 inner sphere lower axis bearing seat
248 outer sphere upper axis bearing seat
250 outer sphere lower axis bearing seat

DESCRIPTION—FIGS. 1 to 7

FIG. 1 is a perspective view of a tabletop chrono-globe. Outer earth globe 20 is made from thin translucent plastic material in two hemisphere parts 22 and 24, with earth's equator being the seam line 26, as with conventional, currently marketed products. Earth globe hemispheres 22 and 24 are produced by conventional manufacturing processes and can be of various types and styles currently being marketed. Assembly of these two hemispheres 22 and 24 into sphere 20 is accomplished by using a bonding material 28 after insertion of a inner day-night sphere 98.

Figure 2:
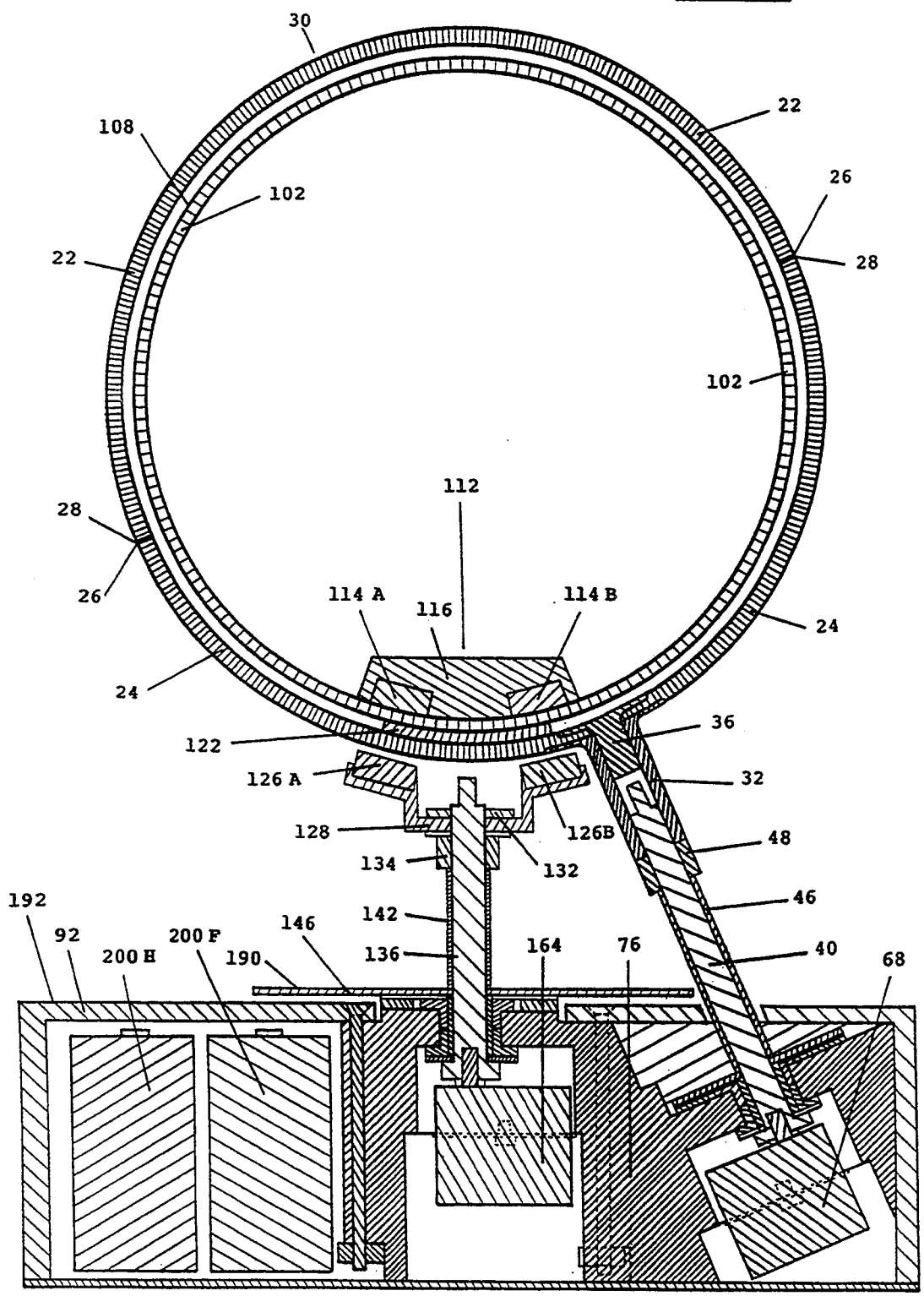
FIG. 2 is a detail view of the portion indicated by the section lines 2—2 in FIG. 1.
Figure 3:
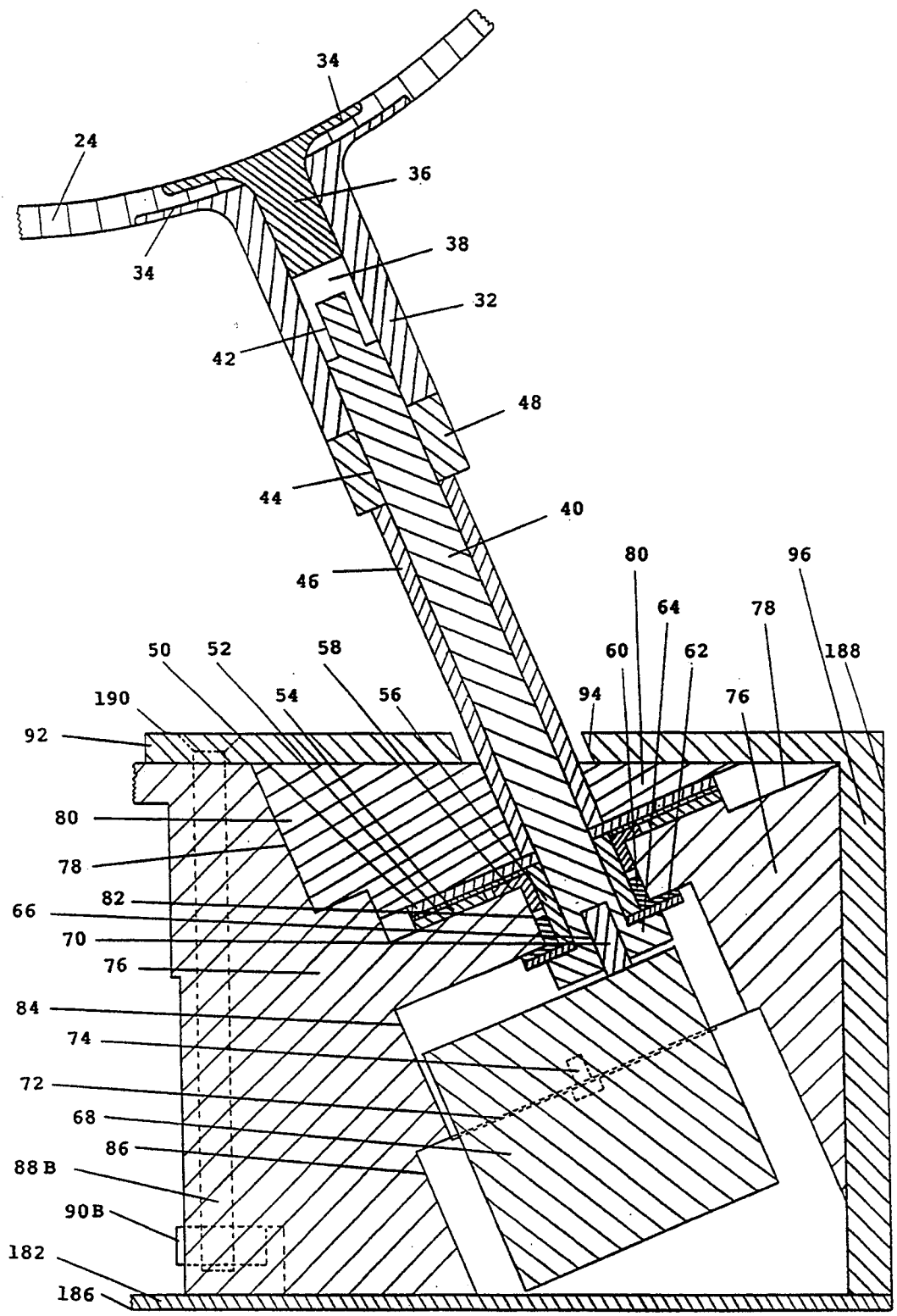
FIG. 3 is a detail view of the earth globe support post bolt and its mount shown in FIG. 2.

FIGS. 2 and 3 shows the structure to hold earth globe 20 in proper position. Earth globe 20 is mounted to earth globe attachment stem 32 at the earth's south pole location by using a bonding material 34 and screw 36. A earth globe support post 40 maintains support for earth globe 20 and attachment stem 32 assembly, and permits easy rotational movement about earth globe 20 geographic north-south pole axis 30. As shown in FIG. 3, earth globe support post bolt shaft 40 has wrench flats 42 on its end, and is threaded 44. Threaded end of bolt 40 is screwed into a threaded hole 38 of attachment stem 32. This secures earth globe 20 to bolt 40; the operational rotation of bolt 40 keeps the joint tight. A bushing 46 is placed over bolt 40.

Support post bolt 40 has its bolt shaft pass down through hole 94 in base box top 92 to a rotational stepper motor device 68 which is mounted firmly with two screws 74 through flange 72 to mounting block 76. A drive shaft 70 of stepper motor 68 is pressed (interference fit) into a drilled hole 66 in head 64 of bolt 40. Earth globe support post bolt 40 is oriented, via holes 82 and 84, upper stepped wedge shaped channel cutout 78, and lower notch cutout channel 86, such that earth globe 20 is positioned with its north-south pole axis 30 tilted approximately 23½ degrees to the vertical. Low friction flanged bushings 58 and 60, and a low friction stepped wedge shaped bushing 80 are used to stabilize the bolt 40 shaft. Support post bolt 40 is mounted to mounting block 76 by use of a selflocking nut 48 on support bolt 40. Mounting block 76 is attached to base box top 92 by three long bolts 88A,B,C and associated nuts 90A,B,C. A steel disk 50 is mounted rigidly to bolt 40 shaft and positioned close to a adhesive backed flexible magnet ring 54 via a tighening of selflocking nut 48, bushing 46, bushing 56, washer 62, and bolt head 64 combination. The length of bushing 56 is such that a snug, but easily rotated unit, is achieved. Thin, low friction material, disk 52 is used under steel disk 50 to maintain easy slippage over flexible, adhesive backed, magnet ring 54. Mounting block 76 is stabilized by its contact to two base box sides 96.

Rotational device 68 is a Big Inch stepper motor produced by HSI Inc.; Waterbury, Conn. Series A31300, two wire, 12 or 24 DC volt models, unidirectional stepper motors are for use with battery and other limited supply power systems. Model A31317 has a counterclockwise (CCW) rotation of 0.36 degrees per step. It operates on 12 volts DC, and gives a maximum drive shaft 70 torque of 4.5 ounce-inch. It is stepped by a simple on-off coil excitation. The rotor turns 180 degrees with power, then 180 degrees with power off. A gearbox associated with the motor reduces the 360 degrees rotation to the 0.36 degrees rotation of each step. Stepper motor 68 is stepped once every 86.164 seconds to achieve, in effect, a 360.9863 degrees rotation of the earth globe 20 every 24 hours.

A timing device used for stepper motor 68 is a typical Programmable Recycle solid-state timer 196 like those produced by American Control Products, Westbrook, Conn. With this kind of device, when input voltage is on, the load (stepper motor 68) is continually pulsed on-off. The duration of the on period of time and the off period of time are independently adjustable. The various time control methods available include a factory preset approach. The operating voltages available for these typical devices are: 12 V, 24 V, 48 V DC. Numerous time ranges are available, including: 1 to 100 seconds ; 0.1 to 10 minutes; 10 to 1000 minutes. The 12 V DC model, 1 and 100 seconds ranges, is the selected model for the 86.164 second step activation sequence: on-time duration=1 second; off-time duration=85.164 seconds. Thus the stepper motor power average on-time for a 24 hour period totals 1002.74 seconds (16.712 minutes).

Figure 4:
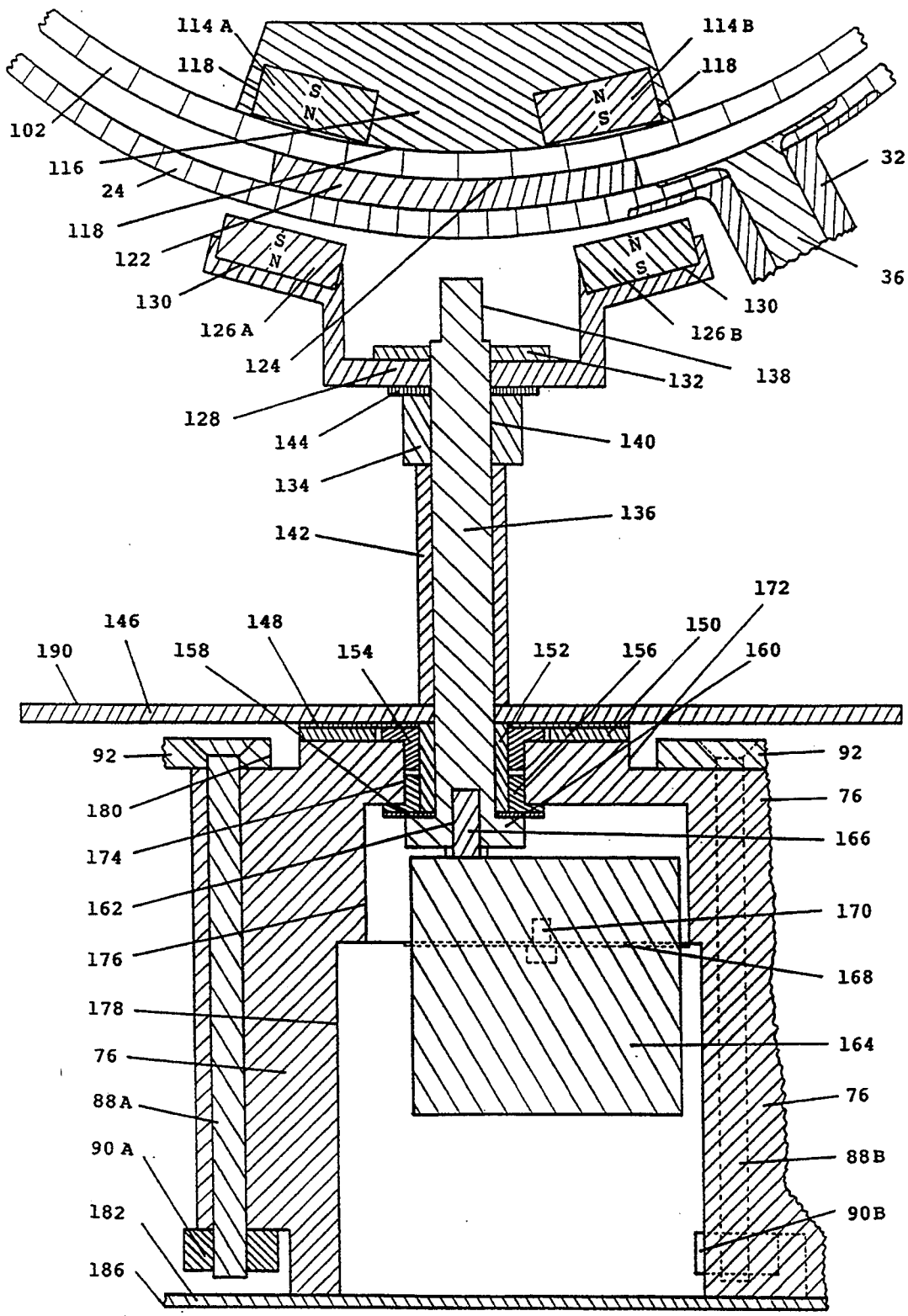
FIG. 4 is a detail view of the outer control magnet system and its mount shown in FIG. 2.
Figure 6:
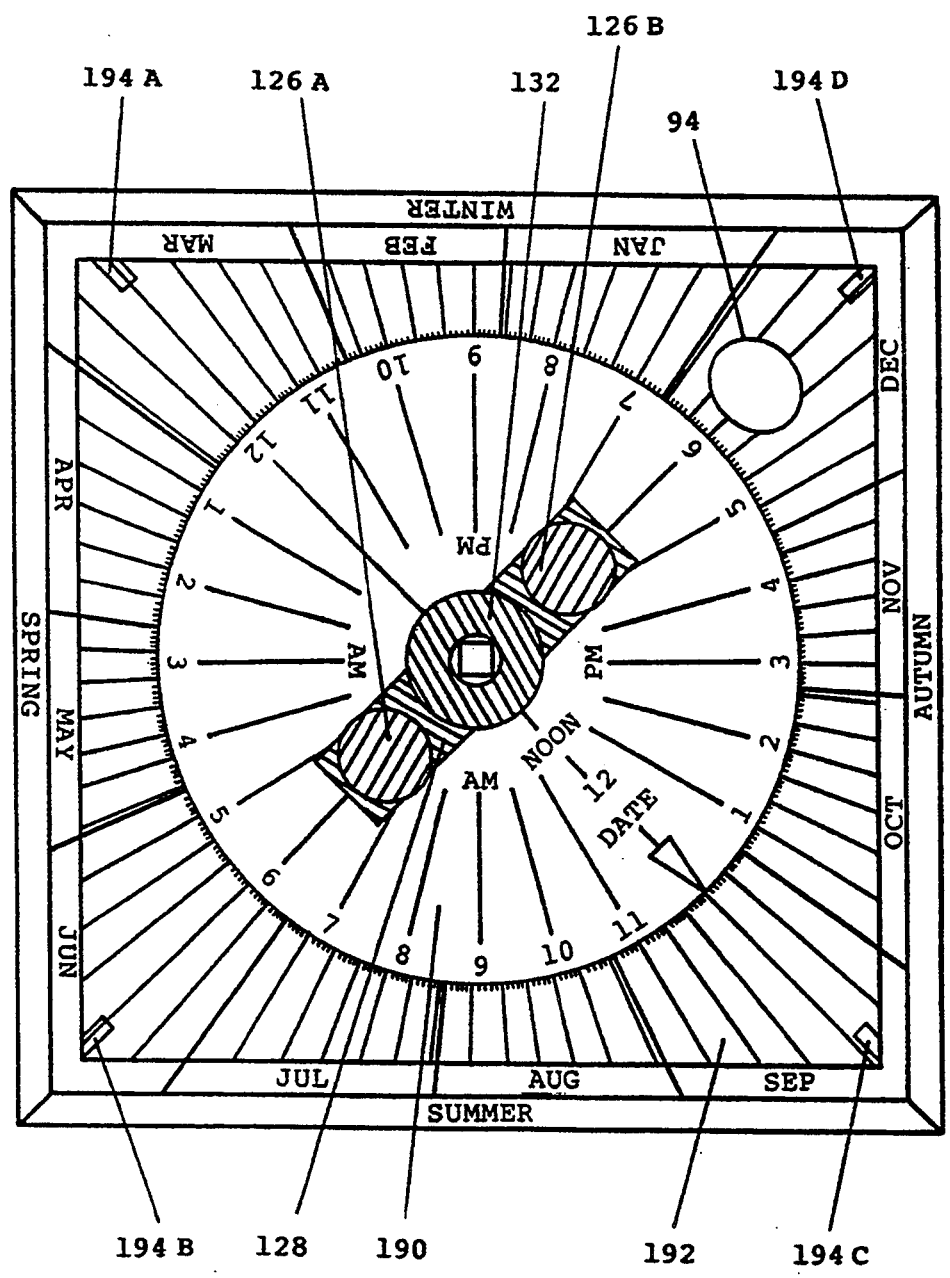
FIG. 6 is a detail view of the outer control magnets, rotating date arrow-hour marks disk decal, and fixed date-month-season reference lines decal shown in FIGS. 1 through 4.

FIGS. 1 and 2 show inner day-night sphere 98. The chronoglobe is constructed by placing inner day-night sphere 98 inside earth globe 20. The outside diameter of inner day-night sphere 98 is slightly less than the inside diameter of earth globe 20 to allow inner day-night sphere 98 to freely rotate inside earth globe 20. Using current manufacturing approaches, inner day-night sphere 98 is made of two thin plastic hemispheres 100 and 102. One hemisphere 100 has a highly reflective white surface 106, while the other hemisphere 102 has a non-reflective black surface 108. When putting the two hemispheres 100 and 102 together, a white-black demarcation diameter line is formed at seam 104; this in essence, creates the day-night "terminator" diameter line evident on the surface of the Earth. Inner sphere 98 white-black seam diameter line 104 is maintained in a vertical plane position by fastening, using bonding material 118, a circular bottoming weight 116 to the inside of inner night hemisphere 102 at white-black seam diameter edge 104. This bottoming weight 116 overhangs seam edge 104 so that its center of mass is directly over seam edge 104. Thus, inner sphere 98, when assembled, always rotates, within outer earth globe 20, to a vertical plane through its vertical axis position 112. Inner day-night sphere 98 is rotatable 360 degrees around its vertical axis 112 by use of a set of magnets 114A,B. FIGS. 2, 3, and 4 shows a sectional representation having inner sphere 98 rotated so that the "terminator" line 104 plane is parallel to and in the plane of the section 2—2. This brings the complete night hemisphere 102 of inner sphere 98 into the section; it also places inner sphere magnets 114A,B in a position where their structure is easily seen. FIG. 6 shows outer control magnets 126A,B in this position. Using bonding material 118, permanent magnets 114A,B are fastened to the bottoming weight 116 at an equal distance from the center of bottoming weight 116 and vertical axis 112. To construct inner sphere 98, two hemispheres 100 and 102 are bonded together using a bonding material 110. Inner magnets 114A,B and circular bottoming weight 116 are also bonded to the inside of day hemisphere 100 during this process. Ecliptic plane hour marks 120, located every 15 degrees, as seen through the translucent colored earth globe 20 are of a distinctive color and shape that stand out against inner sphere 98 colors (white and black) and the various colors used on earth globe 20. Shown on FIG. 1 are dull black diamond shaped marks 120 on day hemisphere 100 and bright white diamond shaped marks 120 on night hemisphere 102. The vertical tip points of these diamond hour marks 120 are positioned 3½ degrees above and below the ecliptic plane.

To ensure that day-night inner sphere 98 rotates-slips easily inside outer earth globe 20, a thin low friction support pad 122 is bonded on the external surface of inner sphere 98 at its bottom point using a bonding material 124. The thickness of this pad is slightly less than the gap space between inner sphere 98 and outer earth globe 20 (½ the difference between the two adjacent diameters). Inner day-night sphere 98 is then placed into earth globe-southern hemisphere 24. Northern hemisphere 22 is then placed over inner sphere 98 and both hemispheres 22 and 24 are bonded together along their equator seam diameter 26 using bonding material 28.

FIGS. 2 and 4 show the structure holding a external companion set of outer control magnets 126A,B. Set close to the external surface of earth globe 20, magnets 126A,B controls the rotational position of inner sphere 98 about its vertical axis 112. Outer control magnets 126A,B are fastened, by using a bonding material 130, to a support arm structure 128 fixed atop a rotating center control post bolt 136 such that magnets 126A,B are in close proximity to the external surface of earth globe 20. The distance between the two control magnets 126A,B is the same as that of the two permanent magnets 114A,B attached inside inner sphere 98. The two inner sphere magnets 114A,B are positioned adjacent to these two control magnets 126A,B. The north-south polarity of these four magnets 114A,B and 126A,B is shown in FIG. 4. This arrangement enables control magnets 126A,B to be "locked" to inner magnets 114A,B, thereby ensuring proper alignment of "terminator" line 104 on the surface of earth globe 20.

Control magnet support arm 128 is fastened to center support post bolt 136 by knurled nut 132 and self-locking nut 134. Nut 132, and shim 144 are used to position control magnet support arm 128 at the proper height above base box top 92. Bolt 136 has two wrench flats 138 at its end and a bushing 142 placed over its shaft 136. A steel date arrow-hour marks disk 146 and supporting items under it: thin, low friction material, disk 148, flexible, adhesive backed, magnet ring 150, bushing 152, low friction flanged bushings 154 and 156, washer 158, and bolt head 160, make up an assembly that allows easy rotation of control magnets 126A,B. Stepper motor 164 is attached to mounting block 76 by two screws 170 through flange 168. A hole 176 in mounting block 76 accommodates stepper motor 164. Three bolts 88A,B,C and selflocking nuts 90A,B,C, hold mounting block 76 to base box top 92. A drive shaft 166 of stepper motor 164 is pressed (interference fit) into a drilled hole 162 in head 160 of center support post bolt 136. A bolt hole 174 and lower rectangular cutout channel 178 allow installation of bolt 136 and stepper motor 164. A pedestal 172 of mounting block 76 fits into opening 180 on base box top 92. Steel date arrow-hour marks disk 146 is mounted rigidly to bolt 136 shaft and positioned close to a adhesive backed flexible magnet ring 150 via a tighening of selflocking nut 134, bushing 142 bushing 152, washer 158, and bolt head 160 combination. The length of bushing 152 is such that a snug, but easily rotated unit, is achieved. Thin, low friction material, disk 148 is used under steel date arrow-hour marks disk 146 to maintain easy slippage over flexible, adhesive backed, magnet ring 150. In FIGS. 2, 3, and 4, rotating date arrow of decal 190 on disk 146 points to the September 21 (its 2 AM subposition) date mark on fixed date-month-season decal 192 located on base box top 92.

Rotational device 164 is a Big Inch stepper motor produced by HSI Inc.; Waterbury, Conn. Series A31300, two wire, 12 or 24 DC volt models, unidirectional stepper motors are for use with battery and other limited supply power systems. Model A31372 has a counterclockwise (CCW) rotation of 0.576 degrees per step. It operates on 12 volts DC, and gives a maximum drive shaft 166 torque of 2.5 ounce-inch. It is stepped by a simple on-off coil excitation. The rotor turns 180 degrees with power, then 180 degrees with power off. A gearbox associated with the motor reduces the 360 degrees rotation to the 0.576 degrees rotation of each step. Stepper motor 164 is stepped once every 14.016 hours to achieve, in effect, a 0.9863 degrees rotation of the inner day-night sphere 98 every 24 hours.

A timing device used for stepper motor 164 is a typical Programmable recycle solid-state timer 198 like those produced by American Control Products, Westbrook, Conn. With this kind of device, when input voltage is on, the load (stepper motor 164) continually pulses on-off. The duration of the on period of time and the off period of time are independently adjustable. The various time control methods available include a factory preset approach. The operating voltages available for these typical devices are: 12 V, 24 V, 48 V DC. Numerous time ranges are available, including: 1 to 100 seconds; 0.1 to 10 minutes; 10 to 1000 minutes. The 12 V DC model; 0.1 and 1000 minute ranges, is the selected model for the 14.016 hour (840.96 minutes) step activation sequence: on-time duration=0.1 minutes; off-time duration=840.86 minutes. Thus the stepper motor power average on-time for a 24 hour period totals 0.17123 minutes.

Figure 5:
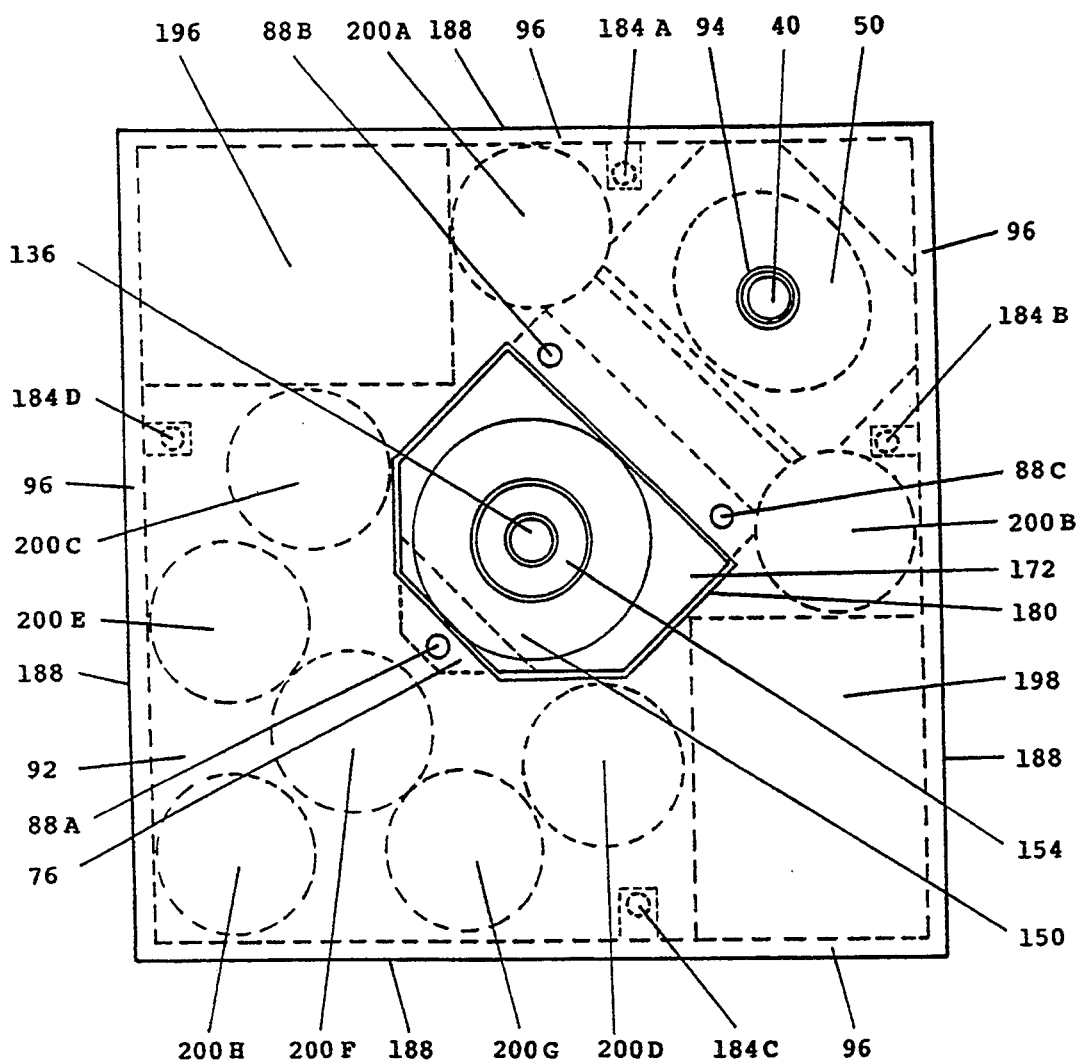
FIG. 5 is a detail view of the base box structure and base box contents shown in FIGS. 1 through 4.

Electric Power (12 V DC) for the chronoglobe is obtained via commercially available batteries. Shown in FIG. 5 are eight 1.5 V "C" size batteries 200A,B,C,D,E,F,G,H used in series: (1.5 V×8=12 V). A typical wall plug-in 120 V AC to 12 V DC power supply transformer device is also acceptable in lieu of battery power.

FIG. 5 shows the layout of base box structure 92. 96 and 182. Base box is formed by appropriately bending one flat piece of material. A base box bottom panel 182 is attached to four base box sides 96 by four attachment screws 184A,B,C,D through four tabs located on the bottom of each box side 96. Adhesive backed felt 186 is used on the bottom of bottom panel 182. Walnut colored-textured adhesive backed sheeting material 188 is wrapped around four box sides 96 to give a decorative appearance. Base box structure provides support for mounting block 76, as well as space for batteries 200A,B,C,D,E,F,G,H, timing devices 196 and 198, and associated wiring.

FIG. 6 shows the top view of rotating date arrow-hour marks decal 190 and fixed date-month-season reference lines decal 192. Date arrow-hour marks decal 190 is adhesively attached to date arrow-hour marks disk 146. Date-month-season reference lines decal 192 is adhesively attached to base box top 92. The plane of the two outer control magnets 126A,B is positioned to be perpendicular to the date arrow of decal 190. This date arrow represents the date (and its hour subdivision) position pointer. Hour designations, representing one hour increments, are placed around the date arrow-hour marks decal 190 at 15 degrees spaced intervals to give appropriate times on earth globe 20.

Date-month-season reference lines decal 192 consists of 366 lines; each space (0.9863 degrees) between successive lines represents one day of the 365 day calendar year. The December 21 (its 8 AM subposition) is placed radial outward (from the rotational center of the control magnet support post bolt 136) towards the earth globe 20 support post bolt 40 centerline where it enters base box top 92 in hole 94. June 21 (its 8 PM subposition) radiates outward in the opposite direction. January date reference lines proceed counterclockwise from the December date reference lines. Four bars 194A,B,C,D, each fifty hours long, on decal 192 show the range of dates and hours on which the summer solstice (June 20—7 AM to June 22—9 AM), winter solstice (December 20—7 PM to December 22—9 PM), spring equinox (March 19—1 PM to March 21—3 PM), and autumn equinox (September 21—11 PM to September 24—1 AM) occur. These dates and hours represent those occuring over the approximate period of years 1993 through 2030.

Figure 7:
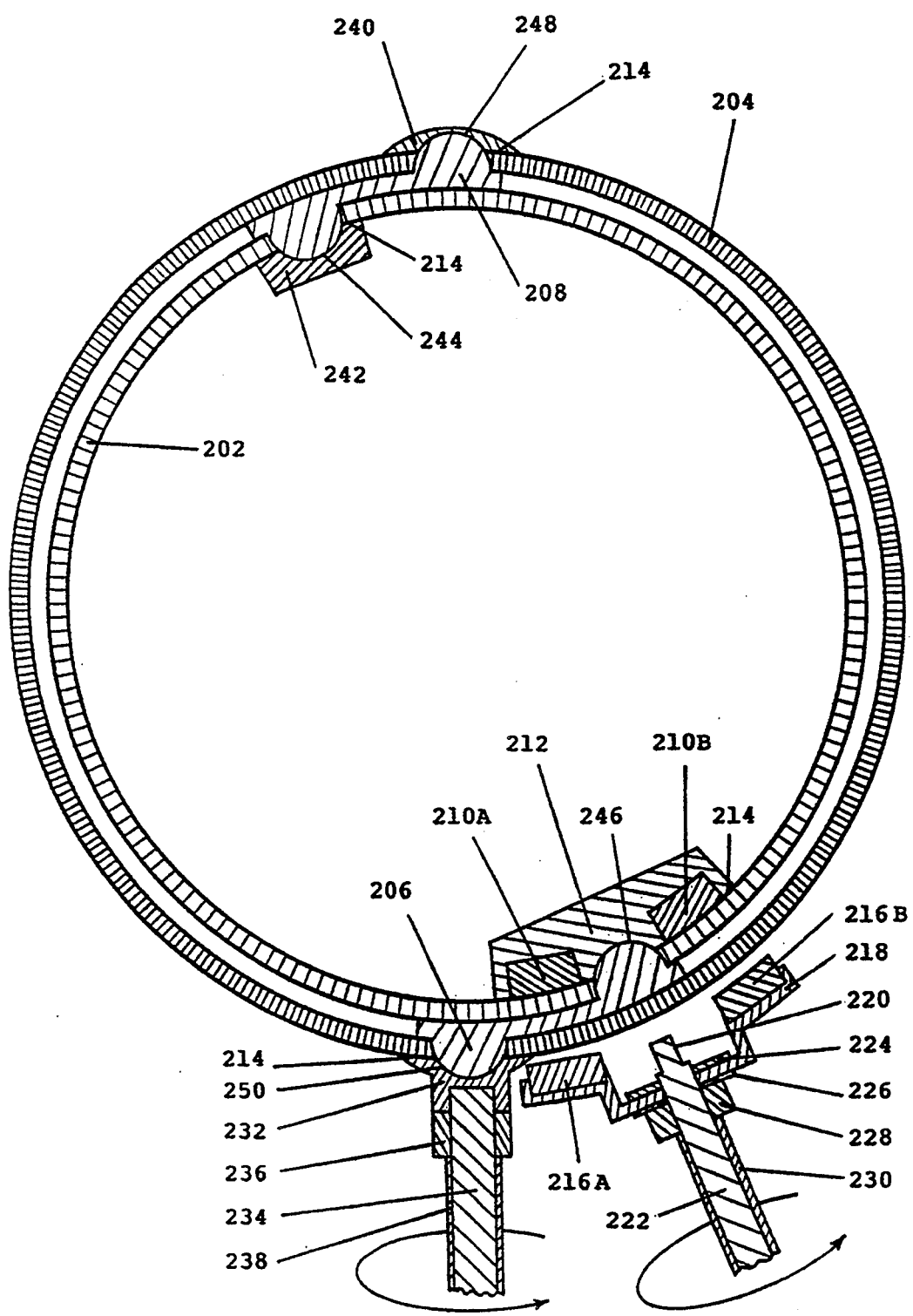
FIG. 7 is a sectional view (similar to FIG. 2) showing the Chronoglobe in the alternate sphere role reversal configuration.

FIG. 7 shows a Chronoglobe in the alternate sphere role reversal configuration. It has outer sphere 204 as the day-night sphere and inner sphere 202 as the earth globe sphere. Outer sphere 204 has one hemisphere transparent to present "day", and one hemisphere semi-transparent to present "night". Hourly marks around outer sphere 204 are the same as those used in the basic Chronoglobe previously discussed. Earth globe sphere 202 is attached to day-night sphere 204 via two thin rectangular shaped, low friction material, spherical segment, hemispherical axis bearings/support pads 206 and 208. Hemispherical axis bearings/support pads 206 and 208 allow both spheres 202 and 204 to independently rotate. Structure 212 retains both inner sphere magnets 210A,B and forms bearing seat 246. Structures 240 and 242 forms bearing seats 248 and 244 respectively. Bonding material 214 is used where indicated. Lower attachment stem structure 232 forms bearing seat 250. Attachment stem 232 is supported by shaft 234, self-locking nut 236, and bushing 238. Support arm 218, knurled nut 224, shim 226, and self locking nut 228 holds both outer control magnets 216A,B atop support shaft 222 and bushing 230. Wrench flats 220 facilitate assembly. Inner earth globe sphere 202 is rotated and held in proper position by action of magnets 210A,B and 216A,B. Support post 222 and 234 are rotated via the same approach as used in the basic version of the Chronoglobe. Date arrow-hour marks and date-month-season chronometric presentations can be the same as with the basic Chronoglobe, or, these presentations can be placed atop the outer day-night sphere.

Taken together, both basic and alternate versions of the Chronoglobe constitute the validation of incorporated concepts for use in a large variety of manufacturing approaches and product line development.

OPERATION—FIGS. 1 thru 7

The chronoglobe device is a sphere within a sphere concept. A outside earth globe 20, of the conventional type, is made of thin translucent plastic. A slightly smaller inside sphere 98 is made of two thin plastic hemispheres 100 and 102, one having a highly reflective external white surface 106, the other having a nonreflective external black surface 108. When joined together, a split seam 104 between these two hemispheres forms a white-black demarcation line around its surface. Thus, inner sphere 98 becomes the day-night "terminator" line device by reflecting incident light on the chronoglobe back through outer translucent plastic earth globe 20.

Inner sphere 98 is maintained (via the bottoming weight 116 and low friction material bottom support pad 122) with this "terminator" line in a vertical-plane position to properly display day-night conditions on earth globe 20 surface. The position of this "terminator" line 104 anywhere (i.e. 360 degrees) around its vertical axis 112, is controlled by the movement of a set of outer control permanent magnets 126A,B that are "locked" to a companion set of inner permanent magnets 114A,B attached to inner sphere 98. This control method is analogous to the Earth's magnetic field effecting a spherical auto compass.

Since white surfaced hemisphere 100 represents day, and black surfaced hemisphere 102 represents night, surfaces of these hemispheres can be marked-identified in such a manner that time can be displayed through translucent earth globe 20. Since noon is always noon on inner sphere 98, a noon mark of distinct shape and color, seen through earth globe 20, will always be correctly positioned. A number of ecliptic plane marks 120, located around inner sphere 98 surfaces 106 and 108 in a plane perpendicular to the plane of "terminator" line 104, show hourly separation points. Marks 120 every 15 degrees show a progression of one hour change every mark. Each ecliptic plane hour mark is used to identify the meridian-longitudinal line on the earth globe associated with that particular hour. By following the meridian-longitudinal lines (inscribed on the earth globe) from the center of these hour marks 120, a close approximation of the proper time anywhere on earth globe 20 can be determined. This ecliptic plane hour mark reading gives rise to unequal hour divisions (degrees) around the equator of the earth globe. Typical earth globe equator time band presentations have equal 15 degree hour division marks around the equator. If the center of each ecliptic plane diamond shaped hour mark is used, the following time differences occur. At the two solstice and two equinox positions, the difference at the 12 noon, 6 PM, 12 midnight, and 6 AM is zero, the maximum difference of 10 minutes of time occurs at the 3 PM, 9 PM, 3 AM, and 9 AM positions. The hour positions of the zero difference and 10 minutes difference are reversed at the calendar positions of early May, early August, early November, and early February. Use of a diamond shaped hour mark, whose vertical tip points are located 3½ degrees above and below the ecliptic plane, reduces the maximum time difference. Instead of using the center of the diamond mark, the vertical tip point is used to identify the earth meridian-longitudinal line associated with that hour mark. When the earth globe equator is above the ecliptic plane, the vertical diamond hour mark tip point that is above the ecliptic plane is used to identify the earth globe meridian-longitudinal line associated with that particular hour; when the earth globe equator is below the ecliptic plane, the diamond hour mark tip point below the ecliptic plane is used. This approach reduces the difference at the hour position of the 10 minute difference but causes a difference to occur at the ecliptic plane and earth globe equator crossover point. The use of the 3½ degree tip point location give rise to a maximum time difference of 6 minutes anywhere around the earth globe. The maximum time difference can be further reduced to under 4½ minutes of time if the diamond tip points are positioned 5 degrees above and below the ecliptic plane; the center of the diamond hour mark is used within 10 degrees of the earth equator-ecliptic plane crossover point and the diamond tip points are used everywhere else. Thus a variety of hour mark tip point locations can be used to meet varying standards of product accuracy, appearance, and useability. Considerations of local timezone variations, daylight savings time changes, etc. would be factored in the time determination by the individual observer. Hour marks 120 are of a distinctive color and shape that stands out against inner sphere 98 surface colors (white-black) and the colors of earth globe 20 used. In this manner, marks 120 will be seen through the translucent colored earth globe 20. Internal lighting is not needed for this device. Normal use of close proximity table/floor lamps, windows, etc., give an adequate amount of incident light to display the day-night appearance of this device.

By correctly positioning outer control magnets 126A,B, day hemisphere 100 of inner sphere 98 can properly display sunlight on earth globe 20 at all times during the calendar year. This inner day-night sphere 98, therefore, must make one 360 degrees revolution per year to enable it to properly display the Earth's revolution around the Sun. Outer earth globe 20 is rotated 360.9863 degrees every day. The combination of these two movements enables the chronoglobe to properly display-maintain chronometric and astronomical characteristics. Smooth magnetic control of inner sphere 98 position is possible because of the very small movements occurring between spheres 20 and 98. The rotation of earth globe 20 and outer control magnets 126A,B results from the use of two separate stepper motors 68 and 164. Outer control magnets 126A,B can, for cheaper product lines, be implemented manually on a daily or weekly basis. Since the rotation of inner sphere 98 is very slow over a calendar year, not much accuracy will be lost with the manual approach to inner day-night sphere 98 control. Correct positioning to base box top 92 and mounting to mounting block 74 of both rotation systems is important.

Since outer control magnets 126A,B are rigidly attached to date arrow-hour marks disk 146, a technique is needed to keep the noon position of day-night inner sphere 98 aligned properly with the date arrow-hour marks disk 146 and associated date arrow-hour marks decal 190. This is accomplished by selecting-aligning the magnetic poles of the magnets used in such a way that inner sphere 98 will lock itself into only one position with respect to outer control magnets 126A,B. With the N-S poles of both inner sphere magnets 114A,B and outer control magnets 126A,B lined up as shown in FIG. 4, day hemisphere 100 portion of inner sphere 98 will always position itself facing the date arrow located on date arrow-hour marks decal 190. These outer control magnets 126A,B are placed on support arm 128 on top of rotating center control post 136 such that outer magnets 126A,B are in close proximity to the external surface of earth globe 20. The distance apart between two control magnets 126A,B is the same as that of inner day-night sphere magnets 114A,B attached inside inner sphere 98. In this manner inner sphere magnets 114A,B are "locked" to outer control magnets 126A,B.

Stepper motors 68 and 164 and solid state on-off timer switches 196 and 198 together become the clock mechanisms that control the rotational movement of both earth globe 20 and outer control magnets 126A,B throughout the calendar year. During periods of non-movement these rotational systems are held in place by thin flexible magnets 54 and 150. Thus movement will only occur when stepper motor rotational devices 68 and 164 are activated, or, as with cheaper models, date arrow-hour marks disk 146 (and thus inner day-night sphere 98) is rotated by hand.

Because of the movement of the Earth about the Sun, date-month-season reference marks decal 192 must be properly aligned with respect to tilted N-S axis 30 of the earth globe 20. Thus, December 21 (its 8 AM subposition), is placed outward, from the rotational center of outer magnet 126A,B control system, towards earth globe support post 40 center where it enters base box top 92. June 21 (its 8 PM subposition) radiates outward in the opposite direction. January is the next month counterclockwise from the month of December when viewed from above Earth globe 20 north pole and date-month-season reference mark decal 192. March 22 (its 2 PM subposition) and September 21 (its 2 AM subposition) become the other two corners of decal 192. Other date-month reference lines are placed appropriately between these four main benchmark references. When the date arrow on decal 190 is pointing at the fixed day-month-season reference lines on decal 192, day-night inner sphere 98 will be astronomically positioned properly. Date-month-season reference marking decal 192 consists of 366 lines, each space (0.9863 degrees) between successive lines represents one day of the 365 day calendar year. Four bars, 194A,B,C,D each fifty hours long, on decal 192 snow the range of dates and hours on which the summer solstice (June 20—7 AM to June 22—9 AM), winter solstice (December 20—7 PM to December 22—9 PM), spring equinox (March 19—1 PM to March 21—3 PM), and autumn equinox (September 21—11 PM to September 24—1 AM) occur. These dates and hours shown represents those occuring over the approximate period of years 1993 thru 2030.

Both earth globe 20 and day-night inner sphere 98 rotate in a counterclockwise direction when viewed from above earth globe 20 north pole. The combination of these movements, above the stationary reference date-month-season marking lines decal 192, will properly display-present-maintain the Earth-Sun chronometric and astronomical characteristics throughout the calendar year. Appropriate times around the globe is presented on rotating date arrow-hour marks decal 190 and via hour marks 120. The extra day of leap year requires a manual adjustment of day-night inner sphere 98 (i.e. set back one day) via manual movement of outer control magnet system 126A,B.

Using 0.36 degrees per step unidirectional stepper motor 68 as the rotational mechanism, earth globe 20 is stepped once every 86.164 seconds, to achieve, in effect, 360.9863 degrees rotation every 24 hours. Using a 0.576 degrees per step stepper motor to rotate outer control magnets 126A,B and day-night inner sphere 98, stepper motor 164 is stepped once every 14.016 hours to achieve, in effect, a 0.9863 degrees rotation every 24 hours. If a manual approach is used to control inner sphere 98 position, the date arrow-hours marks disk 146 with decal 190 can be moved on a daily or weekly basis without much loss of astronomical accuracy. The chronoglobe is initialized and put into operation by activating the power supply 200A,B,C,D,E,F,G,H, and by setting the date arrow on date arrow-hour marks decal 190 to the selected date and subdivision time (correct time + 7 hours) position (of the geographic location selected) on decal 192. The additional 7 hours used in setting the date arrow position reduces the 14 hour date arrow step increment positional error to only + or −7 hours (½ of 0.576 degrees = 0.288 degrees = 0.288/0.9863 times 24 hours = 7.008 hours). Next, earth globe 20 is rotated to place the meridian-longitude of the selected location over the correct time mark (position) of inner sphere 98 ecliptic plane hour marks 120.

FIG. 7 shows a Chronoglobe in the alternate sphere role reversal configuration. It has outer sphere 204 as the day/night sphere and inner sphere 202 as the earth globe sphere. Outer sphere 204 has one hemisphere transparent to present "day", and one hemisphere semi-transparent to present "night". Hourly marks around outer sphere 204, placed on its inside surface, are the same as those used in the basic Chronoglobe previously discussed. Date arrow-hour marks and date-month-season chronometric presentations can be the same as with the basic Chronoglobe, or, these presentations can be placed atop the outer day-night sphere. The operation of this alternate configuration Chronoglobe is the same as with the basic version of the Chronoglobe.

Summary, Ramifications, and Scope

Accordingly, the reader will see that the chronoglobe does provide a simple, but elegant instrument of geometric, chronometric, and astronomic purpose. In addition, it properly presents the geometrical, visual manifestations of the Earth-Sun astronomical system and displays-maintains chronometric characteristics of this Earth-Sun system on an ongoing real-time basis throughout the calendar year. In addition, it properly presents time, date, and season with respect to the rotation of the Earth about it own axis and the rotation of the Earth about the Sun. Taken together, both basic and alternate versions of the Chronoglobe constitute the validation of incorporated concepts for use in a large variety of manufacturing approaches and product line development. Furthermore, the chronoglobe has the additional advantages in that It provides a globe, timepiece, and astronomical display device in a novel adaptation of conventional earth globes currently available.

It provides a unique earth globe device that is fully operable under normal levels of incident light.

It retains the aesthetic appearance of conventional earth globes currently available.

It uses simple, easy to understand concepts and hardware to achieve producibility, durability, operability, and marketability.

It provides a device that can take the form of a variety of product types, styles, sizes, quality and cost.

It provides applicability towards increasing the utility of conventional earth globes.

It provides a proper visual representation of the Earth during a time of ever increasing "Earth consciousness".

Although the description above contains many specificities, these should not be construed as limiting the scope of the invention but as merely providing illustrations of some of the presently preferred embodiments of this invention. For example, the use of the outer control magnets can be mounted-used at a position in or on a horizontal ring globe support structure. The inner sphere magnets would also be moved to this horizontal position to allow the outer magnets to be "locked" to the inner magnets. A rotating date arrow-hour marks ring and decal, and a fixed date-month-season ring and decal would also be placed on the horizontal support structure. In lieu of being firmly attached, outer sphere rotation by magnetic control is also possible. Use of this chronoglobe concept is possible with earth globes supported at both its north and south poles. Roles of inner and outer spheres can be reversed: outer sphere, attached to the vertical center support post, is the day-night sphere; inner sphere, magnetically controlled via the inclined outer post, is the earth globe. In addition, the manual approach to day-night sphere rotation embodied in this invention, could be used with earth globes either using, or not using, AC or DC powered rotation of the earth globe. Also, the unifying concepts used in this device can be incorporated into many other products associated with: celestial bodies or combination of celestial bodies, instruments of data depiction, and ornamental displays.

This invention can be embodied in many products of different form, style, size, and quality, consisting of a wide variety of parts and materials. For example: rotational motion can be achieved via: numerous stepper motor, step angle, integrated circuit motor drive, and timer combinations; gear, friction wheel, or belt drive mechanisms; and hand wind, mechanical, electronic, or electrical clock devices. The timer for the day-night sphere could be replaced by a small on-off switch mounted on the earth globe sphere support shaft; it would be activated one or more times during one complete 360 degree revolution of the earth globe. The stepper motor used for the day-night sphere movement could also be replaced by an escapement mechanism linked to the earth globe sphere support shaft; it would cause a small rotational movement of the day-night sphere for every 360 degree rotation of the earth globe sphere. Timers and/or batteries can be placed at a distance from the chronoglobe. A typical wall plug-in 120 V AC to 12 V DC power supply transformer device is also acceptable in lieu of battery power. Inner and outer spheres can be made of various materials having assorted colors and varying degrees of transparency, translucency, clearness, and texture. Primary or augmentative external and/or internal lighting approaches are possible. In lieu of the low friction material support pad use, low friction coatings on one or both adjacent sphere surfaces; or, a liquid used between the two adjacent sphere surfaces are possible. Alternate bent or curved earth globe posts and associated connecting shafts utilizing universal joints, flex joints, or flex cables, can be used. A magnet approach can replace the bottoming weight; and, electromagnet type outer control magnets can be used. The device for shaft position holding can be a pawl-ratchet wheel device in lieu of the adhesive backed flexible magnet ring approach. Different characters, numerals, forms, and presentations of inner sphere hour marks, date arrow-hour marks decal, and date-month-season reference lines decal are possible. An ecliptic plane, hour mark band can be used. Small digital clocks could be mounted in/on/around the sides of the base box to show actual time for selected locations. A turntable can be incorporated in the base box bottom panel to facilitate rotation of the complete device. In the alternate sphere role reversal configuration, the hemispherical axis bearings/support pads can be replaced by a top and bottom circular channel in the inner side of the outer sphere to maintain inner sphere axis positioning. The basic version of the Chronoglobe can use either the circular channel or hemispherical axis bearings/support pads design approach. In the alternate sphere role reversal configuration, small versions of the date arrow-hour marks and date-month-season chronometric decal presentations can be appropriately placed atop the outer day-night sphere in lieu of the base box top presentations of the basic Chronoglobe configuration. To achieve a more accurate motion representation of the Earth in its elliptical orbit path around the Sun. A microprocessor chip can be used to change stepper motor stepping intervals during the calendar year.

Thus the scope of the invention should be determined by the appended claims and their legal equivalents, rather than by the examples given.

I claim:

1. A celestial body astronomical system, visual manifestation, calendar, and chronometric data display device comprising:

a movable sphere within a movable sphere; one said sphere providing a celestial body representation, the other said sphere providing a sunlight, shadow, terminator representation; one said spheres taking the inner position, the other said sphere taking the outer position, a time scale presentation by means of ecliptic plane time marks located around the circumference of the sunlight, shadow, terminator sphere with said ecliptic plane perpendicular to the plane of the sunlight, shadow terminator presentation, a simultaneous visual manifestation of the celestial body representation, sunlight, shadow, terminator representation, and time marks with incident, external, internal illuminations by means of appropriate degrees of transparency, translucency, opaqueness, clearness, reflectivity, color, and surface renderings of both inner and outer spheres, a proper alignment of both spheres in relation to one another by means of setting the celestial body sphere rotational axis at proper inclination to the sunlight, shadow, terminator sphere rotational axis, a outer sphere support means of conventional base structures and mounting approaches; and a inner sphere support means that enables free rotation and movement of the inner sphere, said means being spherical segment, low friction material pads, bearing arms, or a liquid placed between the inner and outer sphere; said pads, arm, or liquid having no direct physical connection through the outer sphere to external control members, a magnetic means to inner sphere position, rotation, movement control having no direct physical connection between the outer controlling system and the inner sphere; said means being a pairing of inner sphere fastened magnets to outer control magnets of opposite polarity, a presentation of proper visual, calendar and chronometric characteristics of a astronomical system by means of coordinated position, rotation, movement control of both spheres in conjunction with appropriate data displays, a coordinated position, rotation, movement control of both spheres by means of manual, mechanical, magnetic, electronic, electrical devices, used either singularly or in concert, a visual time translation means to read time on the celestial body sphere directly from ecliptic plane time marks presented on the sunlight, shadow, terminator sphere; said means being the use of tips of time marks, extending above and below the ecliptic plane, to establish the celestial body sphere meridian of corresponding time, a magnetic means to achieve transfer of pertinent inner sphere position, movement, time, calendar information through the outer sphere, either through the magnetic inner sphere position, rotation, movement control means or set apart from said means of control, to external appropriate data presentations; said means being a pairing of inner sphere fastened magnets to external magnets of opposite polarity.

* * * * *